H. B. L. GORMAN.
SPEED CONTROL FOR TURRET LATHES AND THE LIKE.
APPLICATION FILED MAY 20, 1915.
1,193,258.
Patented Aug. 1, 1916.
3 SHEETS—SHEET 1.
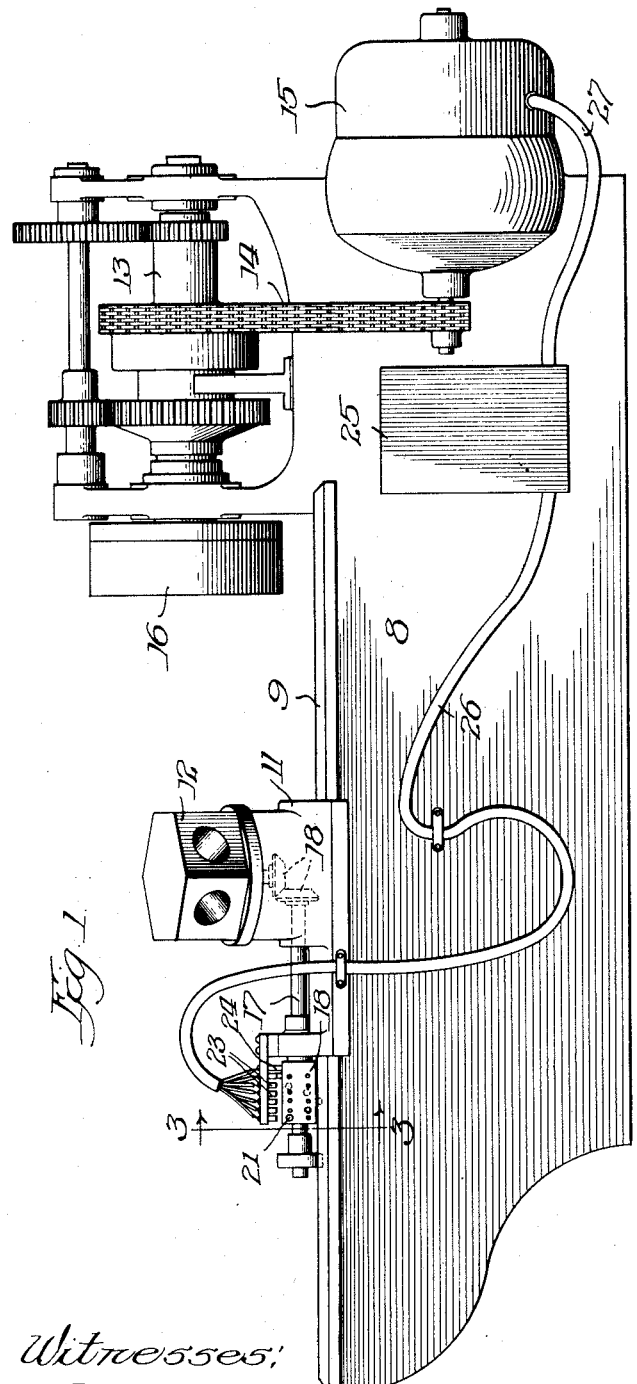
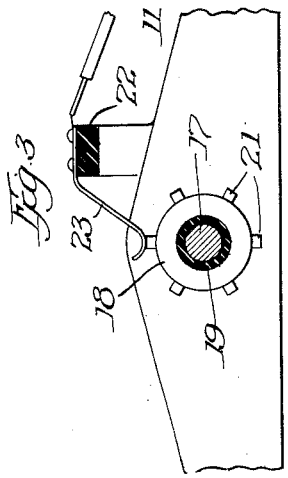
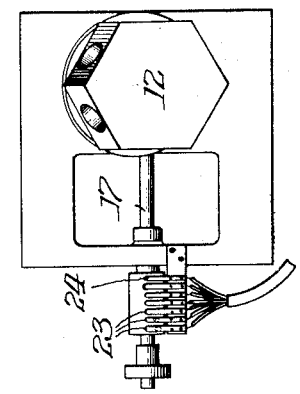
Witnesses:
Inventor
Harry B. L. Gorman
By Pond & Wilson
Attys H. B. L. GORMAN.
SPEED CONTROL FOR TURRET LATHES AND THE LIKE.
APPLICATION FILED MAY 20, 1915.
1,193,258.
Patented Aug. 1, 1916.
3 SHEETS—SHEET 2.
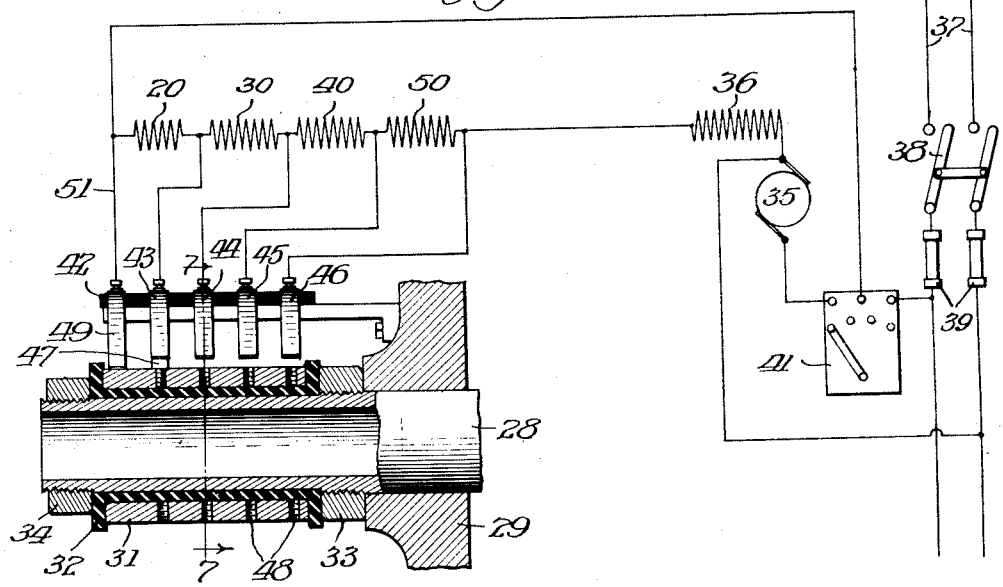
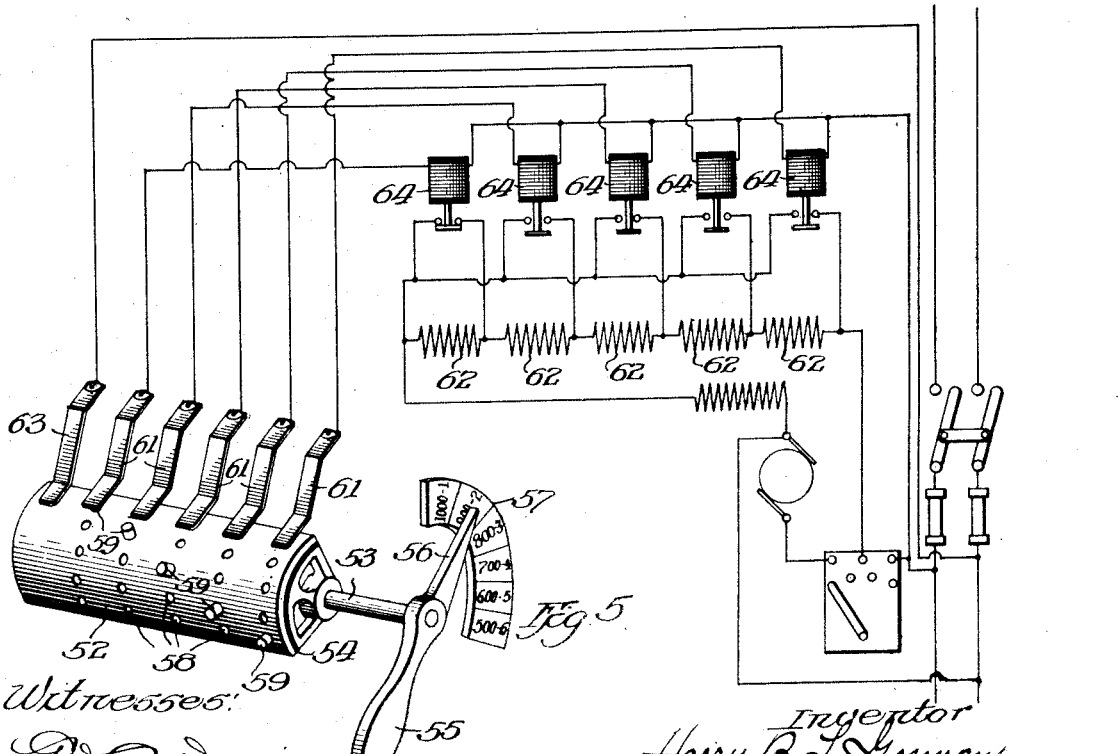
Witnesses:
Fred C. Davies
C. H. Roessner
Inventor
Harry B. L. Gorman
By Pond & Wilson
Atty

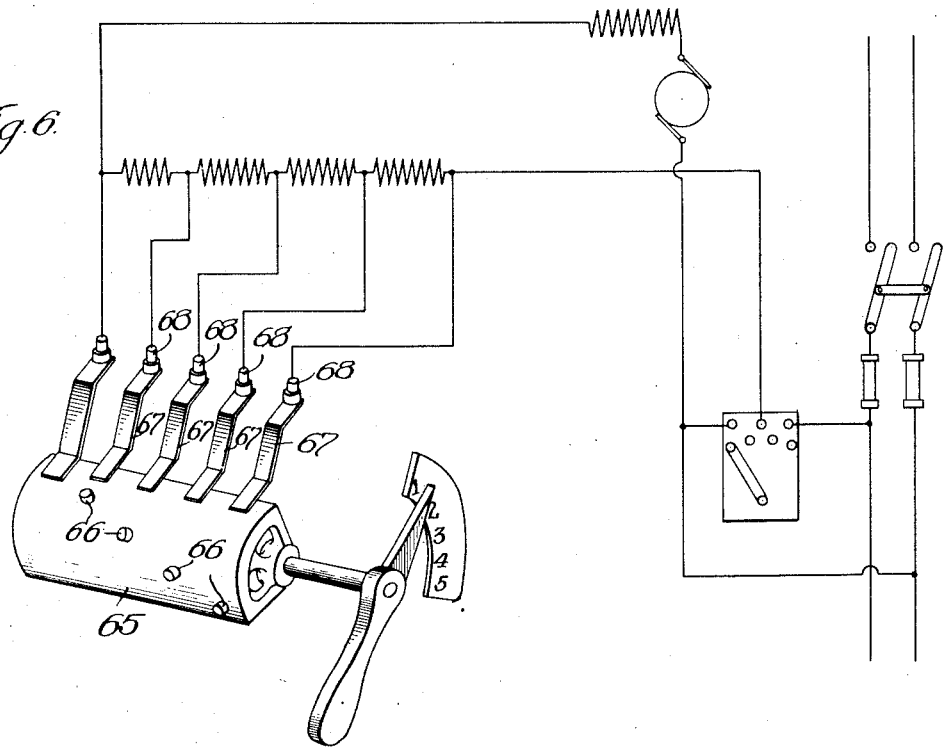
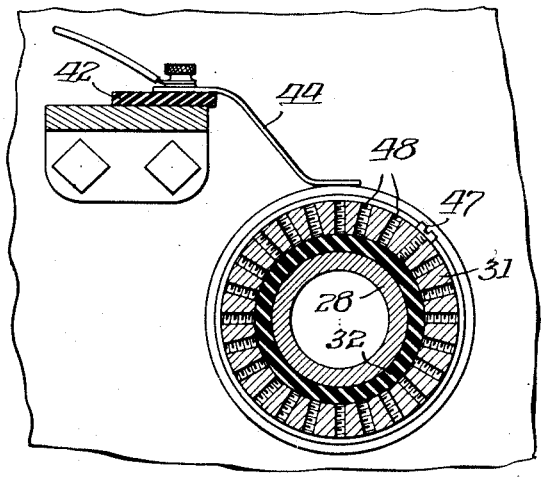

UNITED STATES PATENT OFFICE.

HARRY B. L. GORMAN, OF MADISON, WISCONSIN, ASSIGNOR TO GISHOLT MACHINE COMPANY, OF MADISON, WISCONSIN, A CORPORATION OF WISCONSIN.

SPEED CONTROL FOR TURRET-LATHES AND THE LIKE.

1,193,258.   Specification of Letters Patent.   Patented Aug. 1, 1916.

Application filed May 20, 1915. Serial No. 29,343.

*To all whom it may concern:*

Be it known that I, HARRY B. L. GORMAN, a citizen of the United States, residing at Madison, in the county of Dane and State of Wisconsin, have invented certain new and useful Improvements in Speed Control for Turret-Lathes and the like, of which the following is a specification.

This invention relates in general to systems for controlling the speed of shunt-wound motors and has more particular reference to a system adapted for use in connection with automatic machinery such as automatic turret lathes and similar machines in which the speed of the lathe must be varied to correspond to the particular tool being used at the time.

One of the primary objects of this invention is the provision of a system of speed control of the character above mentioned which will be simple and practical in construction and operation and which will enable the motor to run with maximum efficiency at any and all of the various speeds for which the system is designed.

Another object of the invention is to provide a system of speed control which will be so designed and constructed that the various desired motor speeds may be secured by a simple movement of a movable member, the movement being either manually or automatically effected as the exigencies of the particular machine may require.

Other advantages and many of the attendant advantages of this invention will be readily appreciated as the same becomes better understood by reference to the following description when considered in connection with the accompanying drawings.

Referring to the drawings, Figure 1 is a side elevation of a turret lathe showing one practical application of my invention thereof; Fig. 2 is a fragmentary plan view of the turret and controlling mechanism shown in Fig. 1; Fig. 3 is a sectional view on the line 3—3 of Fig. 1; Fig. 4 is a diagrammatic view of one embodiment of my invention; Fig. 5 is a similar view adapted for use on heavy current circuits; Fig. 6 illustrates a modification of the controlling device shown in Figs. 4 and 5, and Fig. 7 is a sectional view on the line 7—7 of Fig. 4.

From an inspection of the drawings and particularly Figs. 1 to 3 thereof it will be observed that I have illustrated in these figures a turret lathe of standard construction, comprising the bed or frame 8 provided with guides or ways 9 upon which the turret carriage 11, supporting the turret head 12, is adapted to be reciprocated. The spindle 13, driven by a chain 14 from the motor 15, carries the work-holding chuck 16 by means of which the stock to be operated upon is rotated. All of these parts may be of any well known or preferred construction and are merely illustrative of one type of machine to which my invention is applicable.

The turret carriage is equipped with the usual stop-bar 17 geared by the beveled gears 18 with the turret head 12 so as to receive one-sixth of a revolution each time the turret is indexed to bring a successive tool into operative position. In the operation of lathes of this character it is, of course, desirable, in order to secure the highest efficiency, that the lathe be run at as high a speed as is permitted by the character of the work being done and the character of the stock being operated upon. The lathe is set, by means of the usual back-gearing, to run at a speed which will be determined by the character of the stock being worked, but since some tools can operate at a higher speed than others it is necessary in the interests of efficiency to accommodate the spindle speed to each individual tool carried by the turret head. With this end in view I employ a shunt-wound driving motor having a series of resistance sections in series with the field-winding, each section being of predetermined resistance value so as to produce a definite variation in the motor speed, and I have also provided mechanism adapted to be actuated at each indexing movement of the turret for cutting out of the field circuit a predetermined number of these resistance sections to thereby produce the motor speed required by the tool which next operates. In the application of my invention to the lathe shown in Figs. 1 to 3 I have mounted upon the stop-bar 17 a cylindrical member 18 electrically insulated from the stop-bar by an insulation sleeve 19. The member 18 is provided with a plurality of radially projecting pins or plugs 21 which correspond in number to the sockets of the turret head and serve as contact devices for completing a shunt circuit around one or more of the resistance sections, as will be hereinafter more fully explained.

Above the member 18 I have mounted upon an insulated bar 22 a series of contact members 23, each of which is disposed in the path of travel of one of the contact plugs 21. The end contact member 24 is permanently in contact with the periphery of the cylindrical member 18 and forms the common return for the circuit which is completed by engagement of any one of the contact plugs 21 with its corresponding contact member 23. The plugs 21 are disposed about the periphery of the member 18 so that each time a turret tool-socket is moved to operative position one of the plugs makes contact with its contact member 23, thereby closing a circuit which cuts out the requisite number of resistance sections in the motor field-winding to produce the desired motor speed. The wires which lead from the contact members to the resistance box 25 in which the resistance sections are mounted are preferably formed into a cable 26, as shown in Fig. 1, and a second cable 27 leading from the resistance box to the field-winding of the motor 15 connects the resistance sections in series with the shunt-field-winding of the motor.

Having indicated and explained in a general way the construction and operation of my invention and its application to a standard type of turret lathe I will now explain, by reference to Figs. 4 and 7, the details which are illustrated in an assembled view in Fig. 1. In Fig. 4 reference character 28 indicates an indexing shaft which may be the stop-bar 17 shown in Fig. 1, but preferably is the drum shaft 11 of the machine disclosed in U. S. Letters Patent No. 1,081,396, granted to W. L. Miller December 16, 1913. In the application of my invention to the machine disclosed in this patent the drum shaft 11 and indicated in Fig. 4 of the present drawings by reference character 28, is extended outwardly beyond the frame 29 of the machine and equipped with the cylindrical member 31 which is insulated from the shaft by the insulation sleeve 32 and is held in position on the shaft by the collars 33 and 34.

The motor 35 having the shunt-field-winding 36 is supplied with current from the line wires 37 through the usual switch 38 and fuses 39, a suitable starting box 41, of well known construction, being interposed in the armature circuit so that the current may be applied to the motor gradually to enable the motor to gain momentum without injury.

In the shunt field circuit I have interposed in series with the winding 36 a plurality of resistance sections, designated 20, 30, 40 and 50 respectively, each of which has a predetermined resistance value adapted, when cut out, to decrease the armature speed of the motor a predetermined definite amount. Normally the resistance sections are all in the field circuit and the motor will operate at maximum speed, but this speed may be reduced whenever desired by cutting out one or more of these sections.

Upon an insulated bar 42 I have mounted the contact members 43, 44, 45 and 46 which are connected by wires with the field circuit adjacent to the corresponding resistance sections 20, 30, 40 and 50, respectively. The contact members are disposed in proximity to but out of contact with the periphery of the cylindrical member 31 but in the path of travel of the screw plugs or contact devices 47, which are threaded into the sockets 48 formed in the member 31. A common or return contact member 49 is normally in contact with the periphery of the member 31 and through its return wire forms a common return for the shunt circuits around the resistance sections which are produced by contact of one of the contact members with its plug or pin 47.

Assume that in the construction shown in Fig. 4 there are five tools in the turret head, each requiring a different motor speed to secure the most efficient results. The pins or plugs 47 are positioned in the member 31 so as to make contact with their respective contact members when the turret is indexed so that an amount of resistance proportionate to the decreased spindle speed required is cut out of the shunt field circuit as that particular tool is brought into operative position. Assume for instance, that the tools are placed in the turret head so that as they are successively brought into operation the motor speed should be 1,000, 900, 800, 700 and 600 R. P. M. respectively. The resistance sections are so valued that when they are all in series in the field circuit the speed will be 1,000 R. P. M., which is suitable for the highest speed tool. When this tool is in operation no contact plug 47 is in contact with any of the members 43, 44, 45 or 46. When the next tool requiring a speed of 900 R. P. M. is brought into operative position the indexing movement of the turret rotates the shaft 28 sufficiently to bring a plug 47 into contact with the contact member 43, thereby cutting out resistance section 20 and, consequently, reducing the motor speed 100 R. P. M. At the next indexing operation a plug in the member 31 is brought into contact with the contact member 44, thereby cutting out both sections 20 and 30 and reducing the speed of the motor to 800 R. P. M. At the next operation section 40 is cut out and at the next section 50, so that the desired speeds of 700 and 600 R. P. M. respectively, are secured; while at the next indexing operation the last plug will have passed beyond contact member 46 and all of the resistance will have been thrown into the circuit to reëstablish the initial desired speed of 1,000 R. P. M. It will be obvious that if the tools are not so placed in the turret head as to require a gradually decreasing speed the plugs 47 may be so arranged in the member 31 that the required number of resistance sections will be cut out at each indexing operation of the turret.

The embodiment of my invention, illustrated in Figs. 1 to 4 inclusive, is entirely automatic in its operation but in some types of machines it is preferable to have the motor speed under the control of the operator, and in order to provide for this desideratum I have designed the construction illustrated in Fig. 5, which will now be described. In lieu of the cylindrical member 31, shown in Fig. 4, I employ in this instance a sector-shaped member 52 mounted upon a shaft 53 and insulated therefrom by the insulation 54, the shaft 53 being mounted in any accessible or convenient position about the machine and being equipped with a handle 55, by means of which it may be manipulated, and with a pointer or finger 56 which travels over a scale 57 graduated to indicate the speed at which the motor will travel when the member 52 is adjusted to any position. The member 52 is equipped on its periphery with a series of sockets 58 in which contact plugs 59 may be disposed in any desired position so as to be brought into contact with the contact members 61 to cut out the desired number of resistance sections 62. A common contact member 63 permanently contacting with the member 52, is wired to form a common return for the short circuits around the resistance sections.

When heavy currents are employed the making and breaking of the contacts between the contact members 61 and the plugs 59 may cause excessive and an undesirable sparking and arcing, and where such conditions are present I prefer to employ electrically controlled switches, designated by reference character 64, which through their winding cut down the current supplied to the contact members 61 and when operated quickly make or break a non-arcing connection in the shunt circuit around the resistance sections 62. Manifestly the resistance sections may be cut out in any desired sequence by positioning the contact plugs 59 in requisite locations on the adjustable member 52.

Instead of constructing the member 52 so that the contact plugs 59 are adjustable to various positions to cut out the resistance sections, in conformity with the various tool speeds required, I may, if preferred, employ a construction such as shown in Fig. 6 in which the member 65 corresponding to the member 52 of Fig. 5, is equipped with a series of fixedly mounted contact plugs 66 adapted to be brought in regular succession into contact with the corresponding contact members 67. The circuit disclosed in Fig. 6 is practically identical with that shown in Fig. 4, and in order to provide for cutting out the resistance sections in any desired sequence I have attached the wires leading from the resistance circuit to the contact members 67 to plugs 68 removably fitting into the bases of the contact members 67. These plugs may be removed and interchanged at will to cut out the resistance sections in the required order as the contact plugs 66 are successively moved into contact with the members 67. It will be obvious that by employing the interchangeable plugs 68 in connection with the fixed contact plugs 66 the same variation in the sequence in which the resistance sections are cut out can be secured as by changing the positions of the contact plugs 59 and 47, illustrated in Figs. 4 and 5.

It is believed that my invention and its mode of operation will be readily understood from the foregoing without further description, and while I have shown and described preferred embodiments thereof it will be obvious that the structural details shown and described are capable of considerable modification and variation without exceeding the scope of the invention as set forth in the following claims.

I claim:

1. In a system of speed control for turret lathes and the like, the combination of a driving motor having a shunt-field-winding, a plurality of resistance sections in series with said field-winding, each section having a value corresponding to a predetermined motor armature speed, and means whereby any desired number of said sections may be simultaneously cut out of said field circuit to thereby reduce the armature rotation to a predetermined desired speed.

2. In a system of speed control for turret lathes and the like, the combination of a driving motor having a shunt-field-winding, a plurality of resistance sections in series with said field-winding, each section having a value corresponding to a predetermined motor armature speed, and means including a movable member provided with a plurality of adjustable contact points corresponding in number with said resistance sections, for simultaneously cutting out of the field circuit any desired number of said resistance sections to produce a desired motor speed.

3. In a system of speed control for turret lathes and the like, the combination of a driving motor having a shunt-field-winding, a plurality of resistance sections in series with said field-winding, each section having a value corresponding to a predetermined motor armature speed, and means for selectively or consecutively cutting out of the field circuit any desired number of said resistance sections, said means comprising a plurality of contact members connected with the field circuit adjacent to the respective resistance sections, a movable member connected with the field circuit at one side of said group of sections and a plurality of adjustable contact devices carried by said movable member, each adapted to be brought into contact with its corresponding contact member to cut out the corresponding resistance section or sections.

4. In a system of speed control for turret lathes and the like, the combination of a driving motor having a shunt-field-winding, a plurality of resistance sections in series with said field-winding, each section having a value corresponding to a predetermined motor armature speed, and means for reducing the motor armature speed by cutting out either selectively or consecutively a required number of said resistance sections, said means including a cylindrical member provided on its periphery with a series of adjustable contact devices, a corresponding series of contact members electrically connected with the field circuit in parallel with corresponding resistance sections, a common return from said cylindrical member to said field circuit, and means for moving said cylindrical member to bring any desired adjustable contact device into contact with its corresponding contact member, thereby cutting out the requisite resistance sections.

5. In a system of speed control for turret lathes and the like, the combination of a driving motor having a shunt-field-winding, a plurality of resistance sections in series with said field-winding, each section having a value corresponding to a predetermined motor armature speed, and means including a series of adjustable contact members and mechanism for selectively establishing contact with said members for cutting out from the shunt field circuit a predetermined number of said resistance sections.

6. In a system of speed control for turret lathes and the like, the combination of a motor having a shunt-field-winding, a plurality of resistance sections in series with said field-winding, a series of contact members, a lead connecting each contact member with said field circuit adjacent to a corresponding one of said resistance sections, a rotatably mounted device positioned in proximity to said contact members and provided on its periphery with adjustable contacts adapted, upon movement of said device about its axis, to be brought individually or collectively into contact with the correspondingly positioned contact members, and an electrical connection between said device and said field circuit forming a common return for the current shunted around the resistance sections through said device.

7. In a system of speed control for turret lathes and the like, the combination of a driving motor having a shunt field winding, a plurality of resistance sections permanently connected in series with said field winding, each section having a value corresponding to a predetermined motor armature speed, and means for changing the motor armature speed by cutting in or out either selectively or consecutively any desired number of said resistance sections, said means including a series of contact members electrically connected with the corresponding resistance sections, a movable cylindrical member provided with a series of adjustable contact devices corresponding with said contact members, means for moving said cylindrical member to bring any of the said adjustable contact devices into contact with the corresponding contact members, and means for adjusting the adjustable contact devices so that as the cylindrical member is moved in successive steps any desired speed may be obtained for any position of the cylindrical member by cutting in or out one or more of the resistance sections.

HARRY B. L. GORMAN.

Witnesses:
W. L. MILLER,
M. E. GOECKS.